(12) United States Patent
Healey et al.

(10) Patent No.: US 6,507,164 B1
(45) Date of Patent: Jan. 14, 2003

(54) CURRENT BASED POWER MANAGEMENT FOR A TROLLING MOTOR

(75) Inventors: Robert W. Healey, Tulsa, OK (US); Alan L. Proctor, Owasso, OK (US)

(73) Assignee: Brunswick Corporation, Lake Forest, IL (US)

( * ) Notice: Subject to any disclaimer, the term of this patent is extended or adjusted under 35 U.S.C. 154(b) by 94 days.

(21) Appl. No.: 09/840,013

(22) Filed: Apr. 20, 2001

(51) Int. Cl.[7] ............................................. G05B 11/28
(52) U.S. Cl. ........................ 318/599; 318/588; 440/84
(58) Field of Search ................. 318/588, 599; 440/6, 84, 87

(56) References Cited

U.S. PATENT DOCUMENTS

| | | | |
|---|---|---|---|
| 3,736,480 A | * 5/1973 | Lee | 180/6.5 |
| 4,634,944 A | * 1/1987 | Hastings et al. | 318/434 |
| 5,069,642 A | 12/1991 | Henderson | |
| 5,088,943 A | 2/1992 | Henderson | |
| 5,108,322 A | 4/1992 | Henderson | |
| 5,112,258 A | 5/1992 | Folsom | |
| 5,129,845 A | 7/1992 | Henderson | |
| 5,171,173 A | 12/1992 | Henderson et al. | |
| 6,247,980 B1 | 6/2001 | Moore et al. | |

* cited by examiner

Primary Examiner—Jeffrey Donels
(74) Attorney, Agent, or Firm—Fellers, Snider, Blankenship, Bailey & Tippens, P.C.

(57) ABSTRACT

A trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameter, namely: a normal mode wherein the output is set to a commanded level; a current limit mode wherein the output is set to a safe, predetermined level; and a transitional mode wherein the output is incrementally changed from the predetermined level to the commanded level.

11 Claims, 7 Drawing Sheets

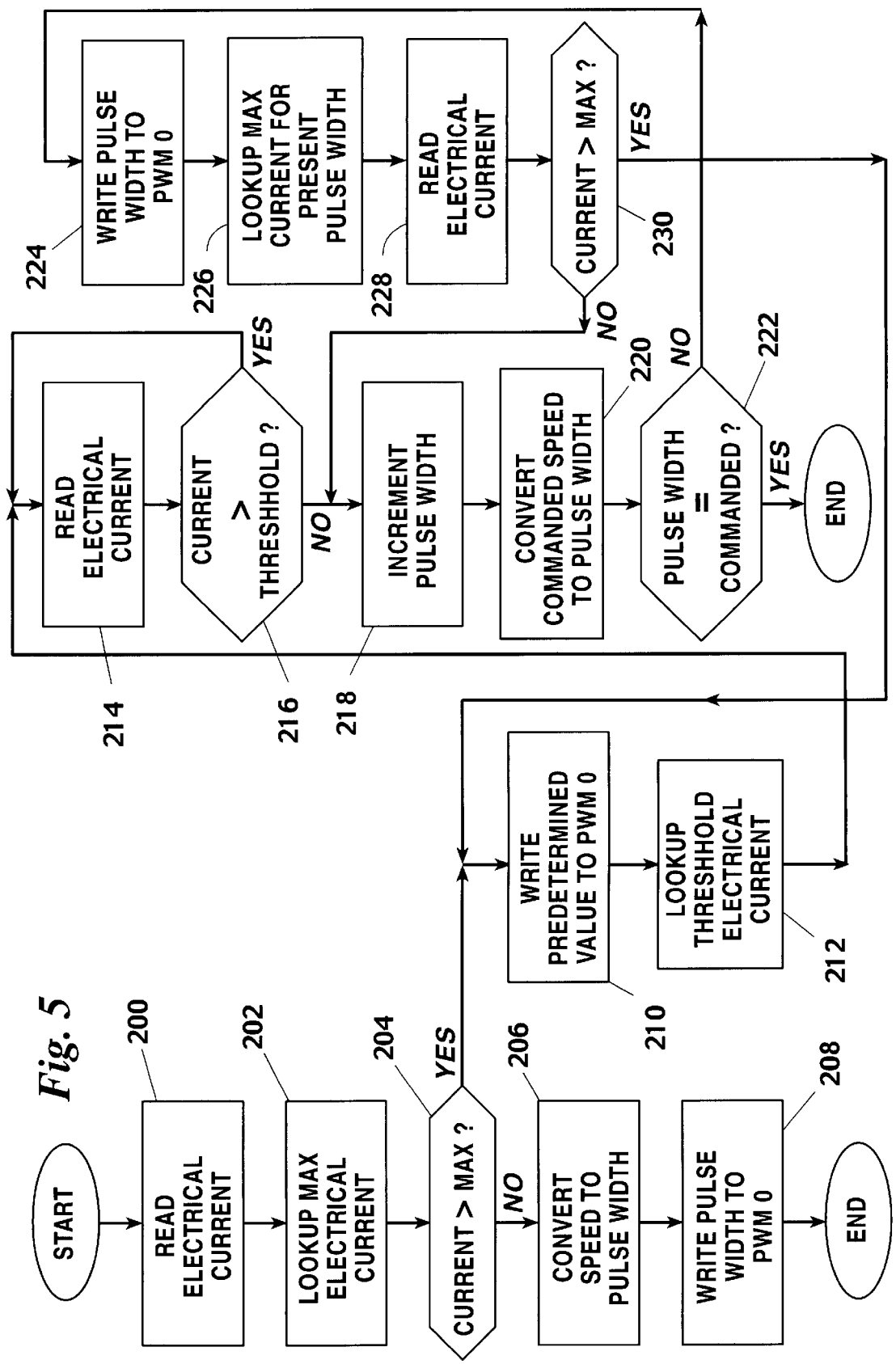

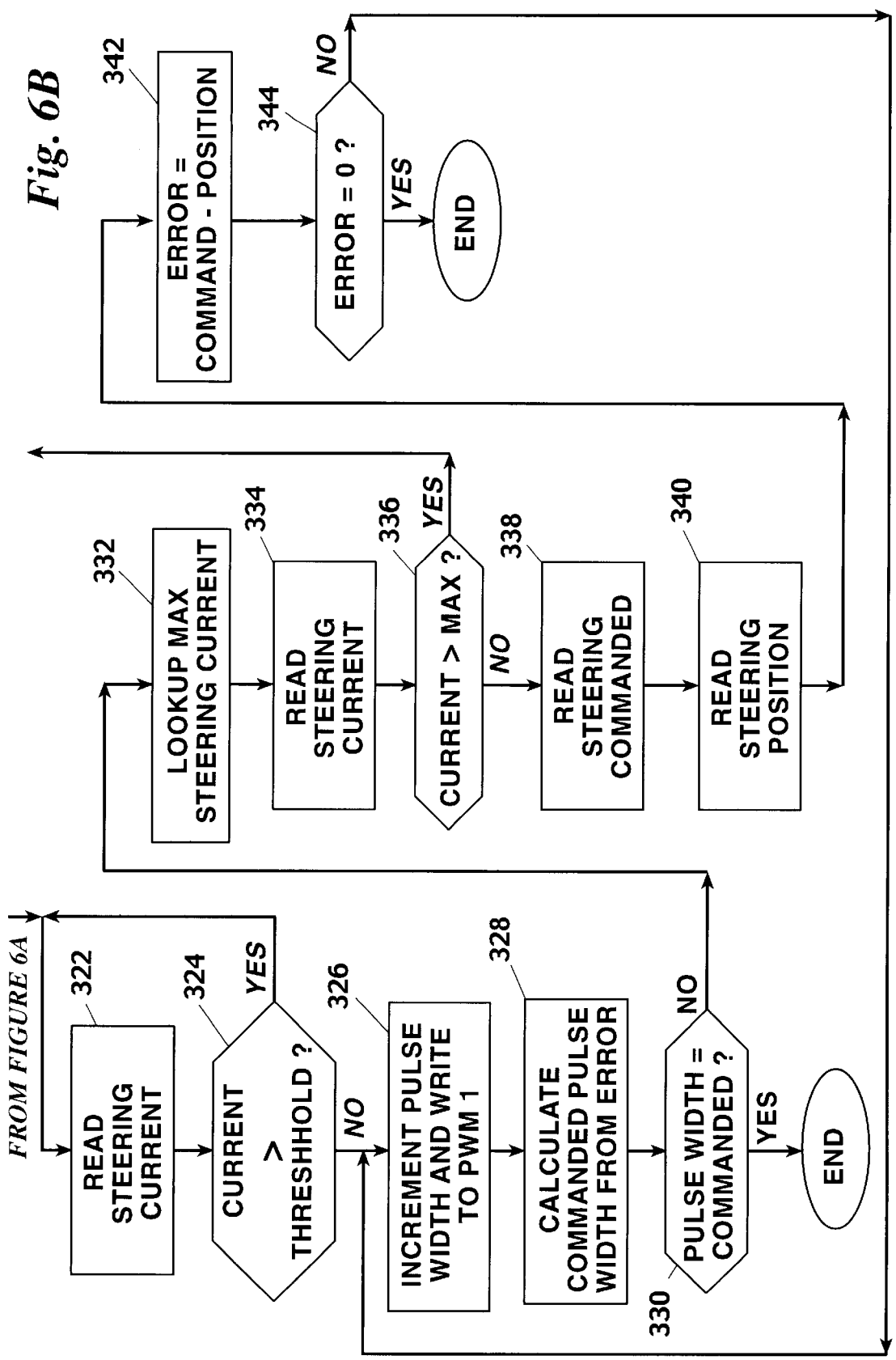

CURRENT BASED POWER MANAGEMENT FOR A TROLLING MOTOR

BACKGROUND OF THE INVENTION

1. Field of the Invention

The present invention relates to trolling motors. More particularly, but not by way of limitation, the present invention relates to an apparatus and method for power management in a trolling motor.

2. Background of the Invention

Trolling motors are well known in the art. Generally speaking, a trolling motor is a relatively small electric motor coupled to a propeller for propelling a boat, or other water craft, at a relatively low speed. Typically, the electric motor and propeller are positioned at the bottom of a support column rotatably supported by a bracket which is attached to the boat. A control head located at the top of the support column houses electrical circuitry for controlling the motor. In addition, the control head may also house a steering motor and associated electrical circuitry to provide rotation of the support column to cause steering of the boat.

Trolling motors may include a number of additional features such as: mounting brackets which provide an operating position and a stowed position for safely positioning the trolling motor during operation of the boats engine or for transportation of the boat; reverse operation for propelling the boat backwards; various styles of foot pedals for controlling trolling motor features; autopilots; and the like.

A fisherman purchasing a trolling motor must typically weigh a number of conflicting factors. For example, a fisherman would typically desire the maximum thrust possible when purchasing a trolling motor. Unfortunately, the greater the peak thrust of a trolling motor, the larger the physical size of the motor, the more the motor must weigh, and, perhaps most importantly, the greater the cost of the trolling motor. This is due to the fact that the size and weight of a trolling motor are driven by the motor's ability to dissipate heat at maximum torque. Presumably, motors will be operated at maximum torque for extended periods of time and, therefore, a motor must be designed to operate at maximum torque indefinitely without adverse effects.

While a trolling motor could be designed to produce high torque for transient, peak loads without a corresponding increase in size, weight, and cost, such a design has been impractical with present trolling motors since there are no safeguards against extended operation of the motor beyond the steady-state operating limits.

A further limitation of trolling motors involves the motor controller response to a stall, or near stall, condition. Trolling motors are known to be placed in a stall condition from a number of environmental factors such as, weed fouling, contact with the bottom, entanglement with ropes or lines, etc. During such stall conditions, the electrical current drawn by the motor would rapidly rise to unacceptable levels if not otherwise controlled. To protect the motor and controller from stall conditions, the controller typically employs a current limit circuit. While current limit circuits found on trolling motors serve to protect the motor and controller, they suffer from a number of limitation. For example: the propeller may immediately resume normal operation when a stall condition is removed causing the boat to lurch or endangering the user's fingers and hands if the fouling condition was cleared by hand; the components which establish the current limit are typically unique to a particular model, thus necessitating a unique controller for each model of trolling motor; the current limit is "tuned" for a particular duty cycle (typically 100% duty cycle) and therefore may perform poorly at other speed settings; custom settings require physical modifications to a controller; and the transitions into and out of the current limiting mode are fixed by the particular design of the controller.

Similar problems exist with steering motor controllers. It is common for such controllers to likewise provide a current limit circuit to prevent damage to the motor and controller if the steering motor encounters a stall. A stall condition may occur when steering is attempted with the motor in a stowed position, if the motor is in contact with the ground, because of entanglement with a rope or line; etc. As with the trolling motor controller, the value of particular components which establish the current limit are calculated or determined empirically at the time the controller is designed and are typically peculiar to a particular trolling motor model. In addition, normal operation of the steering motor may resume immediately upon removal of the condition causing the stall which may result in sudden, unexpected turning of the boat.

Thus it can be seen that there is a need for a trolling motor having a motor controller and steering motor controller which manage the electrical current during peak loads or stall conditions in an intelligent manner.

SUMMARY OF THE INVENTION

The present invention provides a trolling motor having current based power management which resolves the problems and satisfies the needs identified above. The inventive trolling motor comprises: a support column rotatably supported from a mount; an electric motor mounted to the lower end of the support column; and a control head supported at the upper end of the support column. The control head houses a motor controller for controlling the electric motor and a steering system for rotating the support column to steer the boat during operation of the trolling motor. The steering system includes a reversible electric motor driven by a steering motor controller. Typically, both the motor controller and the steering motor controller are in electrical communication with a manual control device, such as a foot pedal, which directs operation of the trolling motor and steering system. Optionally, the motor controller and steering motor controller may also be in electrical communication with an autopilot, or the like, which directs the speed and steering of the boat automatically.

Preferably, the functions of both the steering motor controller and the trolling motor are incorporated into a common controller. A microprocessor or microcontroller (hereinafter "microprocessor") provides a pair of pulse width modulated outputs driving a pair of power amplifiers to proportionally drive the trolling motor and the steering motor. The microprocessor monitors the current flowing through each electric motor with a current sensor, i.e., a current sense resistor, an electromagnetic current sensor, or the like, which produces an output representative of the current flowing through the motor in a form readable by the microprocessor. Alternatively, the microporcessor may provide a signal to a pulse width modulator rather than providing a pulse width modulated output directly.

In the preferred embodiment, a motor is calibrated with a lookup table, stored in the microprocessor's memory, of allowable currents with respect to applied voltage. This table represents a profile of electrical current required operate the motor at any given speed. In operation, the microprocessor designates a motor speed and then refers to the lookup table to find allowable current. When the motor draws more electrical current at a given voltage than is allowed, the microprocessor reduces the applied voltage until the voltage/current relationship is within the limits prescribed by the table. Of paramount importance in a pulse width modulated control system, is the ability of the control circuitry to react instantly to current surges which could damage the power output components, resulting in failure. By constantly monitoring the output current and comparing the current with the maximum allowable current prescribed for any given voltage, the voltage can be adjusted instantly to prevent over-current failures of the drive electronics. The net result is that the microprocessor modulates the motor voltage to stay within the design parameters of the motor regardless of the possible changes of load caused by the above mentioned propeller entanglements or other forces that would impede motor rotation.

The maximum current table has the added benefit of tuning the performance of the motor to the propeller. Although not advisable, a fisherman can change the propeller on his trolling motor to an after-market propeller that will produce increased thrust. This has a deleterious effect on the motor since the motor current increases as the load is increased for any given rotational speed. With the present invention, the motor will still not perform outside of its designed parameters and, therefore, will remain unharmed.

Another subtle effect of the present invention is that the designer is free to design a motor which exceeds "continuous duty" limitations with regard to heat dissipation. Since trolling motors typically are not operated in a continuous mode or as primary propulsion, the motor can be designed to operate in an intermittent fashion with the benefit of higher thrust available to the operator. Since current is constantly measured and the resistance of the motor is known, the operating temperature of the motor can calculated and compensated for. It should be noted that direct measurement of the motor temperature is unnecessary since the resistance of the windings and the applied current may be used to calculated motor heat dissipation ($i^2r$ losses). When the motor is used in the continuous mode for an excessive period of time, the maximum allowable voltage applied to the motor can be slowly reduced to a safe limit that will not exceed the heat dissipating capabilities of the motor and housing. This adjustment is made so subtly that the person operating the motor is unaware of the decrease in performance. The end result is greater performance in intermittent operation while, at the same time, providing continuous duty operation without the concern of overheating or damaging the motor.

It should also be noted that the gradual reduction in torque also conserves energy, extending the operational life of the battery between rechargings.

Furthermore, by comparing the measured current with respect to the expected current draw, the microprocessor can determine when the motor rotation is "stalled" completely. In a complete stall, and after a short period, the drive voltage is removed an the current drops to zero. Since the motor is stalled, it serves no purpose to continue applying power to the motor until conditions responsible for the stall have been removed. This may be by clearing the propeller of weeds or disentangling it from an obstruction. This feature also provides an extra margin of safety for the operator. Sometimes when a motor is entangled and the propeller no longer turns, the operator may be unaware that the motor is being electrically urged to rotate. A fisherman may pull the motor out of the water and attempt to clear the obstruction without turning off the motor. By having the motor automatically turn off in this condition, the operator cannot be inadvertently injured by the prop, were it to resume spinning once freed.

Similarly, maximum current values are stored for the steering motor. If the microprocessor detects electrical current flow through the steering motor which exceeds the predetermined limit, the motor drive is reduced to a very low setting. Upon detecting normal current flow, the microprocessor will gradually return to normal operation, likewise returning to higher torque output in a safe manner.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 5 provides a flow diagram of the preferred processing steps performed by a trolling motor controller in response to a trolling motor over current condition.

FIGS. 6A and 6B provide a flow diagram of the preferred processing steps performed by a steering motor controller in response to a steering command and in response to a steering motor over current condition.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
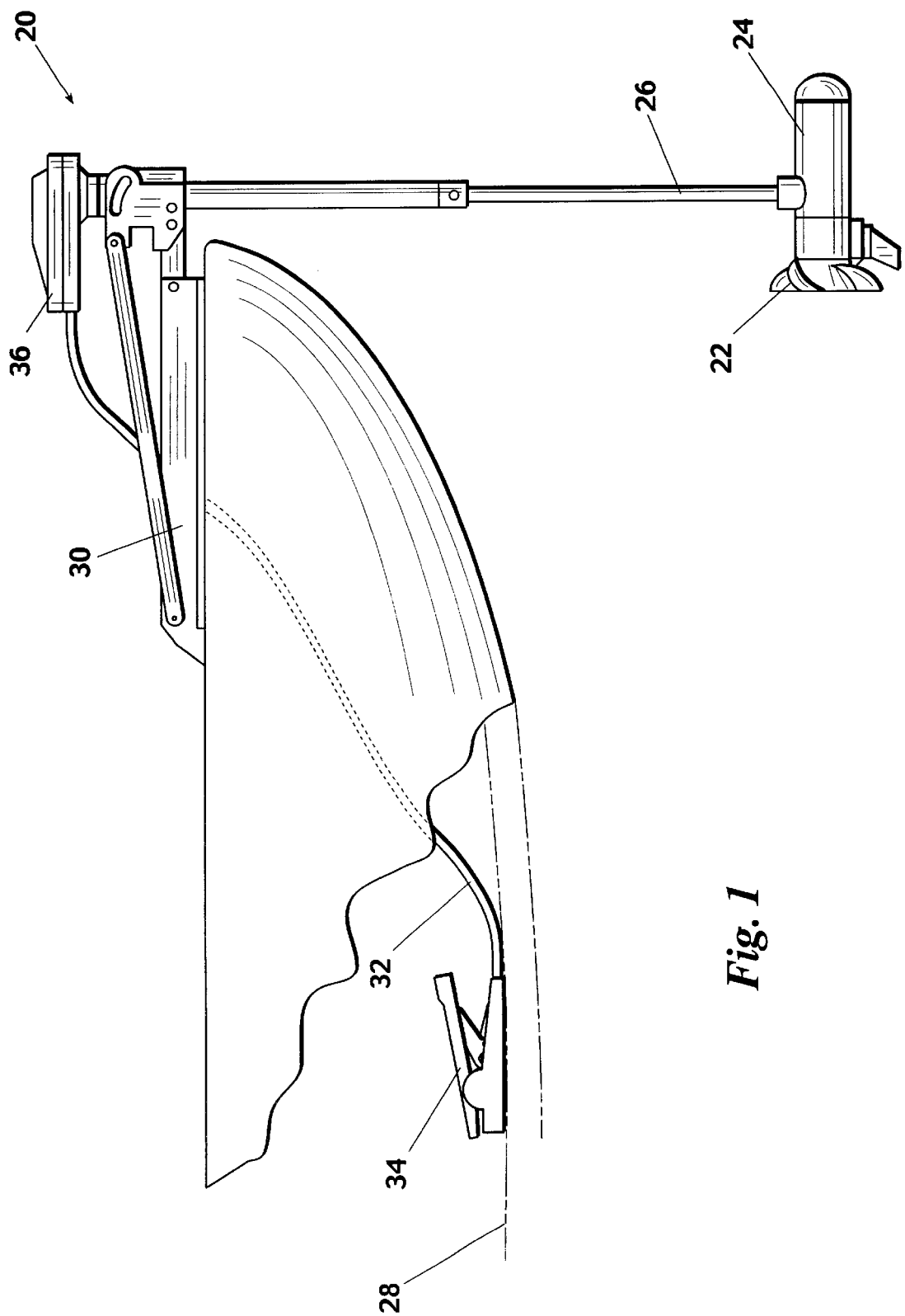
FIG. 1 provides a perspective view of the inventive trolling motor shown in its general environment.

Referring now to the drawings, wherein like reference numerals indicate the same parts throughout the several views, a preferred embodiment of the trolling motor 20 having current based power management is shown in its general environment in FIG. 1. Preferably, trolling motor 20 includes a propeller 22 which is rotatably driven by a submerged electric motor 24. A support column 26 extends downward from the deck of a fishing boat 28 to support motor 24 and propeller 22. A mounting bracket 30 attaches the trolling motor 20 to fishing boat 28. In a typical arrangement, an electrical or mechanical control cable 32 connects a foot pedal 34 to a control head 36. Foot pedal 34 provides convenient control of the rotational speed of the propeller and allows hands-free steering of the boat. Control head 36 houses a motor controller 40 (FIG. 2) which provides suitable circuitry to drive the electric motor 24, thereby urging rotation of the propeller 12. In addition, control head 36 also contains a steering system which includes a steering motor 42 (FIG. 4) and a steering motor controller 44.

Figure 2:
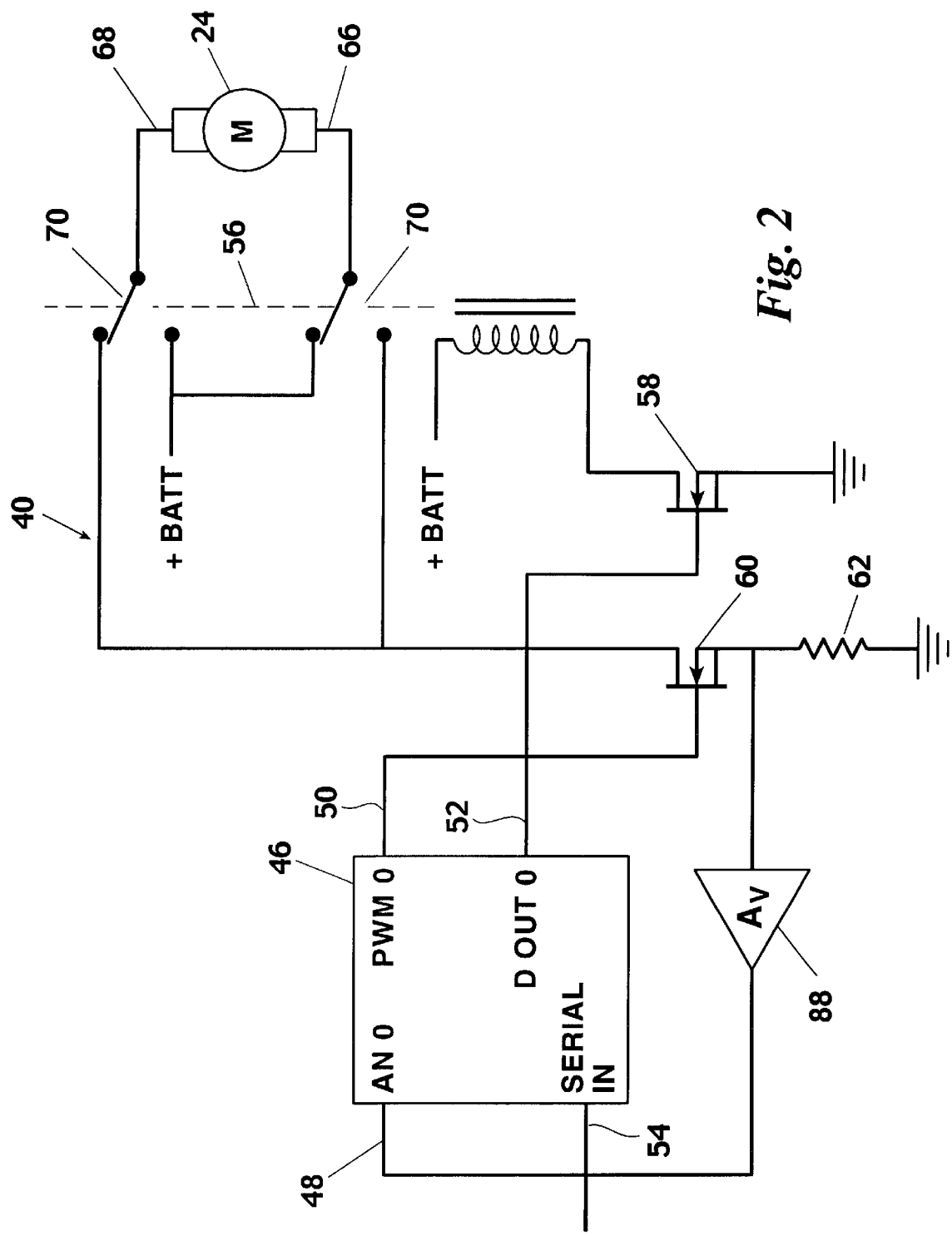
FIG. 2 provides a circuit diagram for a preferred embodiment of a trolling motor controller incorporated in the inventive trolling motor.

Referring next to FIG. 2, motor controller 40 comprises: microprocessor 46 preferably having an analog input 48, a pulse width modulator output 50, a digital output 52, and a serial input 54 for receiving motor speed and steering commands from foot pedal 34; reversing relay 56 for changing the polarity of the power applied to motor 24; relay driver 58 for energizing reversing relay 56 at the direction of output 52; power amplifier switch 60 for energizing motor 24; and current sense resistor 62 and amplifier 64 for measuring the current flowing through motor 24. The output of current sense amplifier 64 is connected to analog input 48 such that the microprocessor can monitor the current flowing through motor 24.

Preferably, motor 24 is a reversible motor. When relay 56 is de-energized, contacts 70 are in a first position wherein the positive terminal of the battery is connected to a first terminal 66 of motor 24 and power amplifier 60 is connected to a second terminal 68 of motor 24. When amplifier 60 is activated, electrical current is allowed to flow from terminal 68 to ground. On the other hand, when relay 56 is energized, contacts 70 are in a second position wherein the positive terminal of the battery is connected to the second terminal 68 of motor 24 and switch 60 is connected to the first terminal 66. When amplifier 60 is activated, electrical current flows through motor 24 in the opposite direction, causing motor 24 to rotate in the reverse direction. Power amplifier 60 is typically a MOSFET, bipolar transistor, IGBT, or the like.

Figure 3:
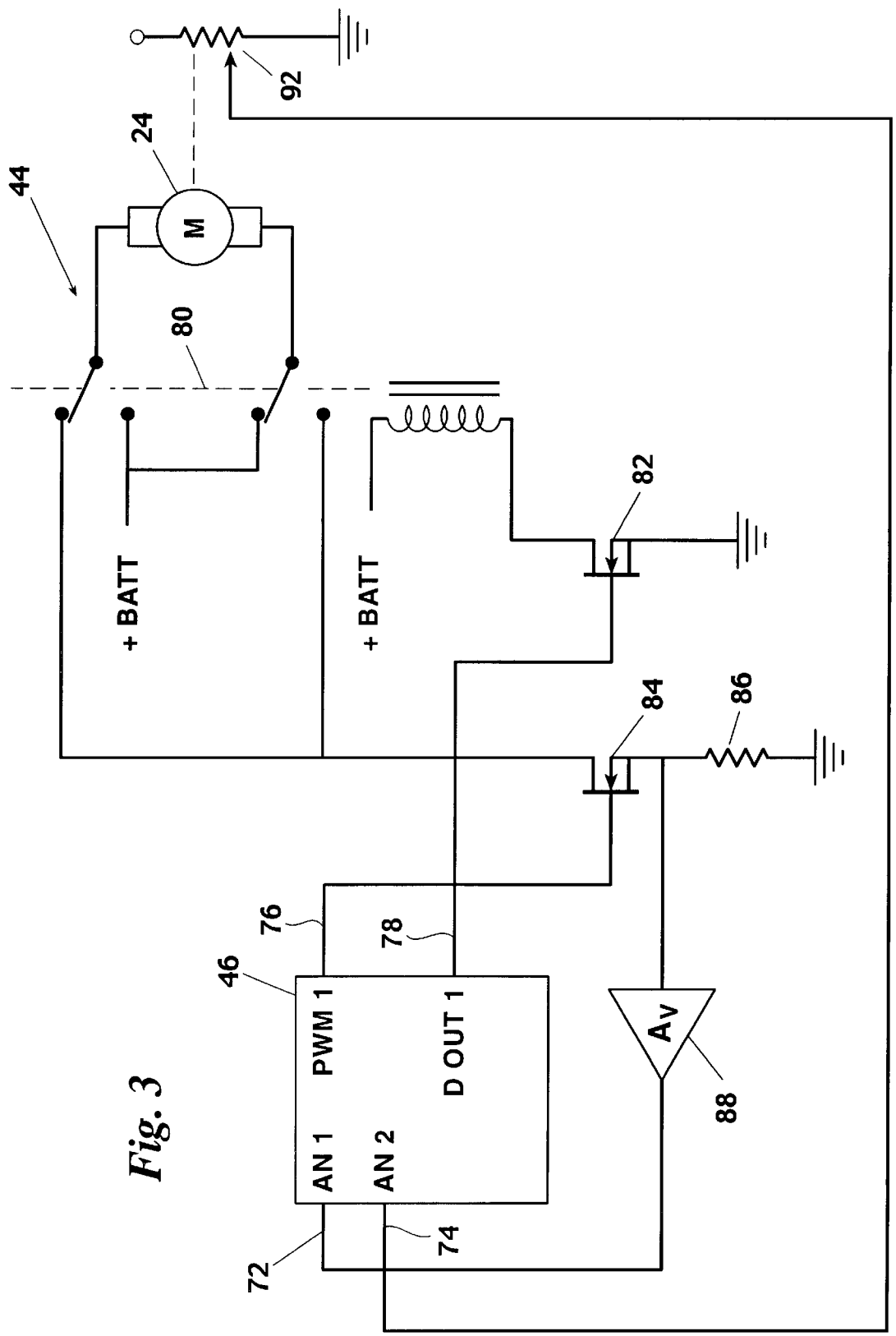
FIG. 3 provides a circuit diagram for a preferred embodiment of a steering motor controller incorporated in the inventive trolling motor.

Referring next to FIG. 3, preferably steering motor controller 44 comprises: microprocessor 46 having analog inputs 72 and 74, pulse width modulator output 76, and digital output 78; reversing relay 80 for changing the polarity of the electrical power applied to motor 42; relay driver 82 for energizing relay 80 at the direction of output 78 to reverse the direction of rotation of motor 42; solid-state switch 84 for energizing motor 42; and current sense resistor 86 and amplifier 88 for measuring the current flowing through steering motor 42. The output of amplifier 88 is connected to analog input 72 such that microprocessor 46 can monitor the current flowing through steering motor 42. Position feedback potentiometer 90 is mounted to control head 36 (FIG. 1) such that the position of wiper 92 is indicative of the angular position of the support column 26 relative to mount 30. Thus, the output of potentiometer 90 is connected to analog input 74 to allow microprocessor 46 to determine the steering angle of motor 24. Switch 84 is typically a MOSFET, bipolar transistor, IGBT, or the like.

It should be noted that in the preferred embodiment, a single microprocessor is used with both the trolling motor controller and the steering motor controller. Alternatively, separate processors could be used for each system, particularly since, to a large degree, the steering system acts independently of the trolling motor controller, and vice versa. It should also be noted that, while preferably microprocessor 46 includes pulse width modulated outputs, an external pulse width modulator under the control of microprocessor 46 could instead be used.

Many trolling motors which have electric steering provide reverse movement of the boat by rotating the motor 180 degrees rather than by reversing the direction of rotation of the propeller. The present invention is suitable for use with such trolling motors. As will be apparent to those skilled in the art, if a total steering range of 360 degrees, or more, is provided, reversing relay 56 and relay driver 58 are not required since reversal of the motor is not required to achieve reverse movement of the boat.

Figure 4:
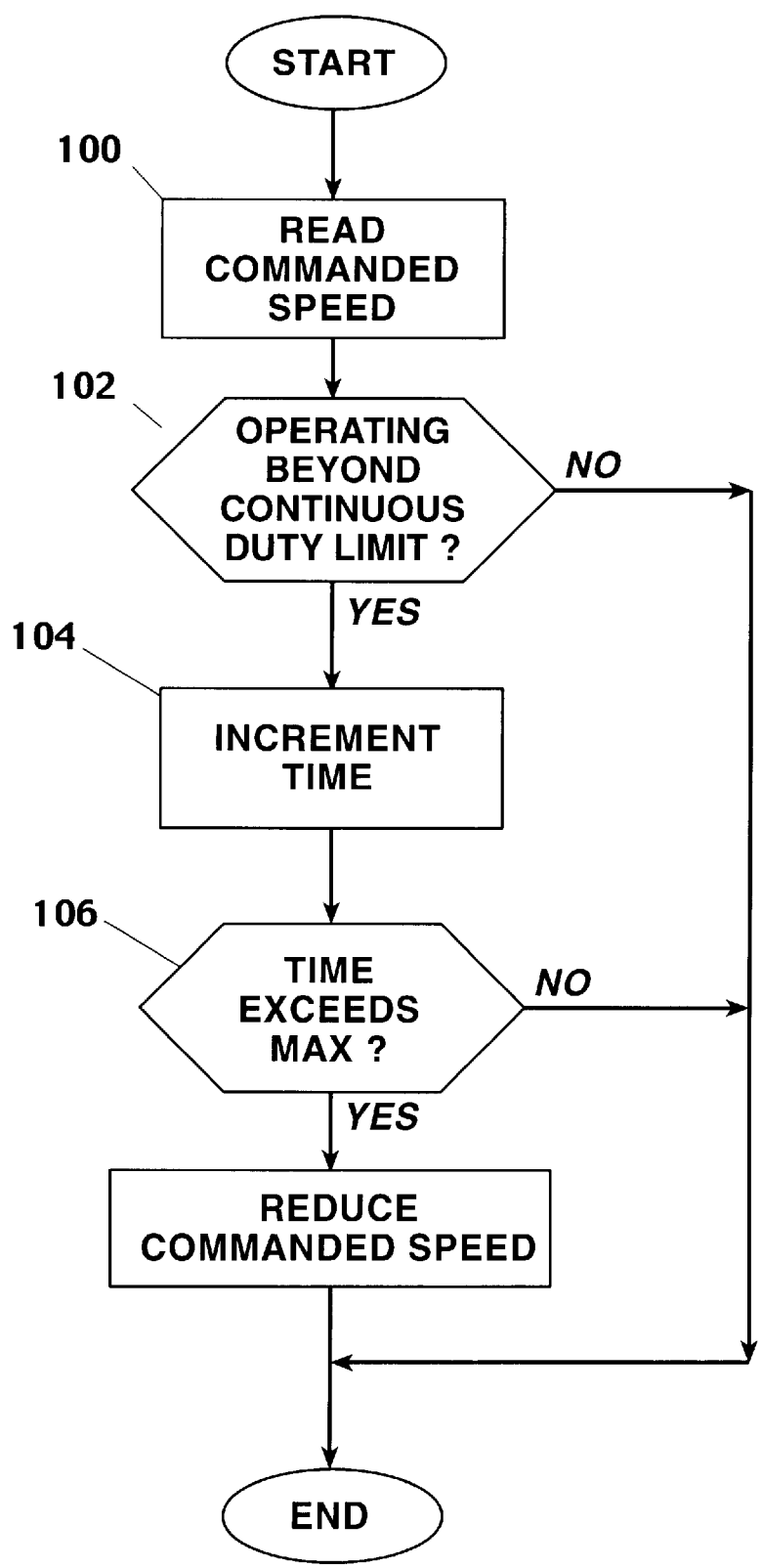
FIG. 4 provides a flow diagram of the preferred steps to perform the peak thrust manipulation in accordance with the present invention.

Referring now to FIG. 4, in operation, microprocessor 46 (FIG. 2) typically reads a commanded speed at step 100. The commanded speed is typically sent from a foot pedal however, the commanded speed could instead be provided from an autopilot, remote control, etc. At step 102, the extent to which the motor is being operated beyond its continuous duty limit is determined. The continuous duty limit is stored in nonvolatile memory in the controller at the time a controller is married to a particular trolling motor. As this value will vary from model-to-model, it is possible to produce, and inventory, a single controller suitable for use with a variety of trolling motors. As will become apparent from the discussion hereinbelow, a number of values are drawn from nonvolatile memory and from various lookup tables likewise stored in nonvolatile memory. Such values may be stored upon assembly of the trolling motor, thus making the inventive controller adaptable to virtually any trolling motor.

If, at step 102, the motor is operating beyond its continuous duty limit, at step 104, the operating time beyond the continuous,duty limit is calculated and compared to a maximum time at step 106. If the time exceeds the maximum, the commanded speed is reduced slightly at step 108. If the time calculated at step 104 does not exceed the maximum at step 106, or if the motor is not operating beyond its continuous duty limit at step 102, the commanded speed is not modified. Thus, if the trolling motor is being operated at or less than its steady-state maximum torque, no correction will be made to the commanded speed. However, if operation is attempted above the steady-state maximum, the controller will operate at the higher torque for, a predetermined period of time and then gradually reduce the commanded speed until operation is within steady-state limits.

As will be apparent to those skilled in the art, the maximum time the motor may be operated beyond the continuous duty limit may be stored in nonvolatile memory within the controller, thus allowing adjustment of the maximum time from model-to-model or to accommodate special conditions.

While the above described process reduces the thrust based on the period of time the motor is operated above its continuous duty limits, the ultimate goal is to prevent over heating of the motor. It should thus be noted that the reduction in thrust could instead be triggered by sensing or calculating the temperature of the motor. As previously mentioned, the heat dissipated in the motor may easily be calculated since the resistance of the motor windings and the current flowing through the motor are known. If thermal characteristics of the motor are also known, the theoretical temperature of the motor could be calculated and the torque reduced as the motor approaches a predetermined maximum temperature.

In another alternate embodiment, the motor temperature could be sensed, as with a thermocouple. Typically, the temperature sensor would be housed within motor 24 (FIG. 2). The output of the temperature sensor is then connected to an analog input of microprocessor 46 such that the motor temperature could be monitored directly. The motor would simply be allowed to operate above its continuous duty limit until the motor approaches its maximum temperature limit. Upon nearing the temperature limit, the torque would be reduced until the temperature stops rising.

In addition to calculating the appropriate output power to apply to the trolling motor drive, the controller 40 (FIG. 2) must also test for over current conditions such as occurs in a stalled condition. Referring next to FIGS. 5 and 2, the current limit process begins at step 200 wherein the microprocessor reads the actual electrical current as indicated at analog input 48. Next, at step 202, the maximum current is drawn from a lookup table. Unlike prior art devices, the maximum electrical current may vary based on a number of operating parameters such as present torque output, motor temperature, etc. The particular limit will also vary depending on the particular model of trolling motor. As with the temperature values, the current limit values are stored in nonvolatile memory in the controller at the time the controller is mated with the trolling motor.

The actual electrical current usage is next compared to the maximum current at step 204. If the electrical current is less than the maximum, the adjusted speed calculated at step 112 (FIG. 4) is used to determine the pulse width at step 206 and written to the pulse width modulator at step 208. On the other hand, if the actual electrical current exceeds the maximum current, the controller transitions to the current limit mode beginning at step 210.

At step 210 the pulse width is set to a minimal value which allows the controller to monitor the state of the motor. This pulse width is sufficiently narrow that excess heat will not be created in a stalled motor, that relatively small currents will flow through the motor so as to protect power amplifier 60 (FIG. 2), and so that, upon clearing of the stall condition, the motor will not immediately turn. At step 212 the controller next looks up the threshold current which will maintain the stall condition. Then, at step 214, the microprocessor reads the electrical current represented by the voltage at analog input 48 and, at step 216, the actual current is compared to the threshold. If, at step 216, the actual current exceeds the threshold current, the process returns to step 214 and remains in the current limit mode. If, instead, the current does not exceed the threshold, the process begins the transition back to normal operation at step 218.

The transition back to normal operation occurs in a loop-wise fashion beginning at step 218 wherein the output pulse width is adjusted incrementally towards the commanded pulse width from step 206. At step 220 the commanded speed is converted to a pulse width and, at step 222, compared to the present pulse width. If the present pulse width is not equal to the commanded pulse width at step 222, the pulse width is written to the pulse width modulator at step 224 and the maximum current for the present pulse width is drawn from a lookup table at step 226. At step 228 the actual electrical current is read from analog input 48 and, at step 230, compared to the maximum value from step 226. If the actual current is less than the maximum current, processing continues at step 218. If the actual current exceeds the maximum current at step 230, then the process returns to the current limit mode at step 210.

Once the present pulse width equals the commanded pulse width at step 222, the trolling motor resumes normal operation.

Thus it can be seen, as long as the motor is driven within its safe, steady-state limits, and as long as there is not a current limit situation (i.e., a stall condition) the trolling motor will operate at the commanded speed received at input 54. If the motor is operated beyond its steady-state limits, after a period of time, the power applied to the motor will be gradually reduced to safe limits. This allows a smaller trolling motor to produce high peak torques to overcome transient situations or to accelerate to a higher maintainable speed than would otherwise be possible.

If a stall condition occurs through, for example, weed fouling or bottom contact, the trolling motor controller will instantly reduce the current to a minimal level. Upon removal of the fault, the trolling motor will gradually return to the commanded settings. This will allow the propeller to resume operation at a slow, low torque setting. If normal conditions are observed by the controller as the propeller accelerates, normal operation is resumed. The graduated transition out of the current limit mode prevents sudden acceleration of the boat which could throw an occupant off balance, reduces the risk of motor damage if the motor should immediately re-stall, and reduces the risk of injury if the condition causing the stall is cleared by hand.

At step 202, the maximum current is drawn from a lookup table. The table is constructed such that for any commanded voltage, an acceptable operating current may be read from the table. Preferably, as a step in the manufacturing process, each motor controller will be calibrated to a particular trolling motor. This calibration step is required to setup the values stored in the lookup table. Initially, the uncalibrated controller has minimum numbers stored in the table which would completely preclude operation of the motor under load. If operation of the motor were attempted with an uncalibrated board, the current limit at each operating voltage would be so low that the propeller would barely turn.

Once a motor, propeller, and a motor controller are mated, the calibration procedure is performed in a tank of water. The motor controller is first directed to apply increasing voltage to the motor drive circuitry. For each incremental increase in voltage, the electrical current is measured and stored at a discrete location in the lookup table as the "expected" current. Once this calibration is complete, the motor will operate normally when referring to this table of values.

It should be noted that the inventive motor controller can thus be installed into virtually any trolling motor and operate safely. Through the calibration procedure, the controller measures the designed operating parameters and adapts to the particular motor/propeller combination. It should also be noted that, regardless of how the table is constructed, there is a unique table that will apply to any unique motor design. As will be apparent to those skilled in the art, the maximum current table is representative of the current based motor torque curve. Each unique motor and prop combination will have a unique operational torque curves which can be established as constant for that particular design. A library of such tables may be stored in a computer and, in turn, the appropriate table loaded into the controller memory motor as the controller is mated to a trolling motor, thereby eliminating the need to program each motor individually.

Figure 6A:
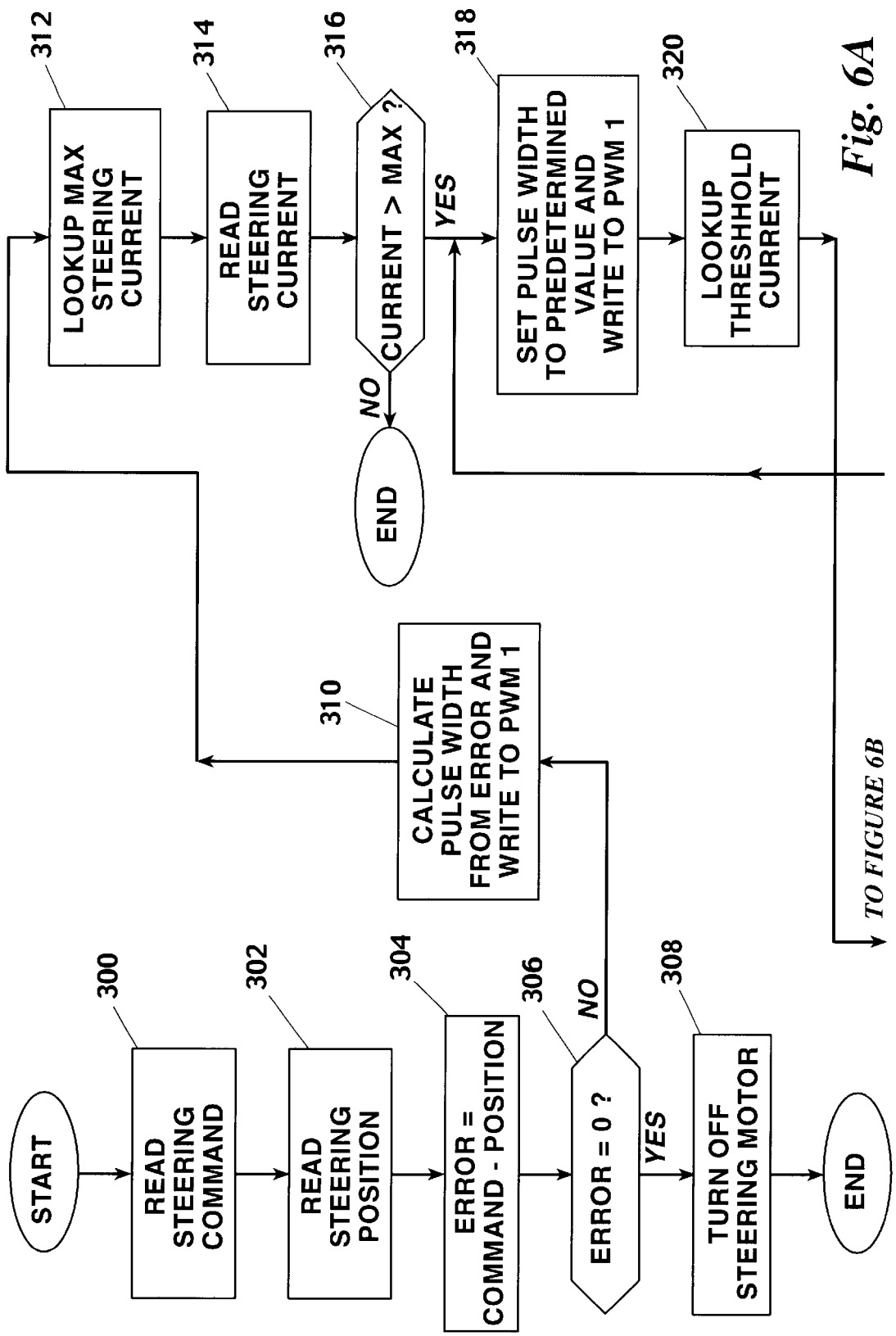

As can be seen in the flow chart of FIGS. 6A and 6B with further reference to FIG. 3, the steering motor is controlled in a manner similar to the trolling motor. At step 300, a steering command is read, typically, the steering command is received from a foot pedal, autopilot, or the like. Next, at step 302, the actual steering position, as indicated by feedback potentiometer 90 (FIG. 3) is read from analog input 74. An error value is calculated by subtracting the actual position from the commanded position at step 304. If, at step 306, the error is zero, the steering motor is turned off at step 308. If, instead, there is a positional error, a pulse width is calculated from the value of the error from step 304 and written to the pulse width modulator at step 310.

At step 312, the maximum steering current is drawn from a lookup table and, at step 314, the electrical current flowing through the steering motor is read from analog input 72. If the current does not exceed the maximum current, at step 316, the process ends until the next pass of the program. If, on the other hand, the current exceeds the maximum current at step 316, the pulse width is set to a predetermined value for current limiting operation at step 318.

The threshold current for the current limit mode is then looked up at step 320. At step 322 the present current usage is read from analog input 72 and, at step 324, compared to the maximum current. If the current continues to exceed the maximum current at step 324, processing returns to step 322 for continued monitoring of the current.

When the current falls below the threshold at step 324, the transition back to normal operation begins at step 326. At step 326 the pulse width is adjusted towards its commanded value. The commanded pulse width is recalculated at step 328 in case the servo should solve during the recovery process. Next, at step 330, if the pulse width equals the commanded pulse width, normal operation is resumed. Otherwise, at step 332 the maximum current is drawn from a table and actual current is again read at step 334 from analog input 72. If the current exceeds the maximum at step 336, processing returns to the current limit mode at step 318. If the current is within the limit at step 336, the steering command is read at step 338, the steering position is read from analog input 74 at step 340, and an error value is calculated at step 342. If, at step 344, the error is zero, normal operation resumes. Otherwise the transition continues at step 326.

The lookup table referred to in step 312 may be constructed from empirically obtained values in the same manner as the table of step 212 in regard to the trolling motor controller.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A trolling motor comprising:
   an electric motor supported from a boat by a support column;
   a propeller coupled to said motor for propelling said boat; and
   a motor controller having an output to provide a voltage to said electric motor,
   wherein there is a continuous duty limit such that when the voltage provided at said output is below said continuous duty limit, said electric motor can be operated continuously, and
   wherein said electric motor may be operated intermittently with said output voltage above said continuous duty limit.

2. The trolling motor of claim 1 wherein there is a maximum output voltage which said controller will provide at said output and wherein when the voltage provided at said output exceeds said continuous duty limit, said maximum voltage is incrementally reduced.

3. The trolling motor of claim 2 wherein, when the voltage at said output is below said continuous duty limit, said maximum output voltage is incrementally increased.

4. A trolling motor comprising:
   an electric motor supported from a boat by a support column;
   a propeller coupled to said electric motor for propelling said boat; and
   a motor controller having an output to provide a voltage to said electric motor, said motor controller further including a current sensor for measuring the electrical current flowing through said motor,
   wherein for any given voltage provided at said output, there is a predetermined operating current such that, for at least two different voltages which may be provided at said output, the predetermined operating current corresponding to one of said different voltages is different form the operating current corresponding to the other of said different voltages, and
   wherein when said motor controller measures an electrical current exceeding the predetermined operating current corresponding to the voltage provided at said output, said motor controller will reduce the voltage provided at said output.

5. The trolling motor of claim 4 wherein, after the voltage at said output is reduced and said motor controller measures an electrical current less than the predetermined operating current corresponding to the voltage provided at said output, said motor controller will increase the voltage provided at said output.

6. The trolling motor of claim 5 wherein said output is a first output and said current sensor is a first current sensor and further comprising:
   a steering motor; and
   a steering motor controller having a second output to provide a voltage to said steering motor, said steering motor controller including a second current sensor for measuring the electrical current flowing through said steering motor,
   wherein for any given output voltage there is a predetermined steering current, and when said steering motor controller measures an electrical current exceeding the predetermined steering current for the voltage provided at said second output, said steering motor controller reduces the voltage provided at said second output.

7. The steering motor controller of claim 6 wherein said first current sensor and said second current sensor are the same current sensor.

8. The steering motor of claim 6 wherein after said steering motor controller has reduced the voltage provided at said second output and said steering motor controller measures an electrical current less than the predetermined steering current corresponding to the voltage provided at said second output, said steering motor controller will increase the voltage at said second output.

9. A trolling motor comprising:
   an electric motor supported from a boat by a support column, said support column rotatable with respect to said boat;
   a propeller coupled to said electric motor for propelling said boat;
   a steering motor for rotating said support column; and
   a steering motor controller having an output to provide a voltage to said steering motor, said steering motor controller further including a current sensor for measuring the electrical current flowing through said steering motor,
   wherein for any given voltage provided at said output, there is a predetermined steering current such that, for at least two different voltages which may be provided at said output, the predetermined steering current corresponding to one of said different voltages is different form the steering current corresponding to the other of said different voltages, and
   wherein when said steering motor controller measures an electrical current exceeding the predetermined steering current corresponding to the voltage provided at said output, said steering motor controller will reduce the voltage provided at said output.

10. A motor controller for a trolling motor comprising:

an output for providing a voltage to an electric motor;

a current sensor for measuring the electrical current flowing through said output; and nonvolatile memory, wherein when the motor controller is in electrical communication with an electric motor, the motor controller can be directed to perform a calibration wherein the motor controller sequentially provides a series of discrete voltages at said output, measures the electrical current at each of said discrete voltages, and stores each measured current in said nonvolatile memory.

11. A method for creating a lookup table of operating currents for a trolling motor, each of said operating currents corresponding to a given operating voltage and said trolling motor including a motor housing and propeller, including the steps of:

installing a motor controller including nonvolatile memory in a trolling motor;

submerging the motor housing and propeller in water;

sequentially operating the trolling motor at a plurality of discrete voltages;

measuring an electrical current value at each discrete voltage of said plurality of discrete voltages; and storing each of said electrical current values at a discrete location in the lookup table.

\* \* \* \* \*